United States Patent [19]

Cardimona et al.

[11] Patent Number: 5,196,097
[45] Date of Patent: Mar. 23, 1993

[54] METHOD AND APPARATUS FOR FIELD-INDUCED TRANSPARENCY USING LASER RADIATION

[75] Inventors: David A. Cardimona; Mohinder P. Sharma, both of Albuquerque, N. Mex.

[73] Assignee: The United States of America as represented by the Secretary of the Air Force, Washington, D.C.

[21] Appl. No.: 637,916

[22] Filed: Jan. 7, 1991

[51] Int. Cl.$^5$ ............................................. C01B 3/00
[52] U.S. Cl. .................................. 204/157.41; 372/8
[58] Field of Search ...................... 204/157.15, 157.41; 372/8

[56] References Cited

U.S. PATENT DOCUMENTS 3,778,361 12/1973 Courtney-Pratt ............ 204/157.1 R
4,124,466 11/1978 Morrey ............................ 204/157.46
4,366,379 12/1982 Cotter ................................... 204/900

OTHER PUBLICATIONS

Patel & Slusher, Self Induced Transparency in Gases, Oct. 1967, 3019-3022.
"Effect of Atomic-State Coherence and Spontaneous Emission on Three-level Dynamics", by D. A. Cardimona, Phys Rev A 41, 5016 (1990).

*Primary Examiner*—W. Gary Jones
*Assistant Examiner*—Dean Nguyen
*Attorney, Agent, or Firm*—Bobby D. Scearce; Donald J. Singer

[57] ABSTRACT

System and method for selectively inducing transparency to laser radiation in a material are described comprising a material having a ground state and two closely-spaced first and second excited states wherein the transition dipole moment $d_1$ between the ground and first excited states is parallel to the dipole moment $d_2$ between the ground and second excited states, and wherein $d_1$ is substantially equal to $zd_2$ where $z$ is a scalar constant characteristic of the material, and wherein the frequencies of transition between the ground and first excited states and between the ground and second excited states are $\omega_o$ and $\omega_o + \Delta$, respectively, and a source of laser radiation for substantially totally irradiating the material with laser radiation of frequency $\omega_L$ substantially equal to $\omega_o + \Delta/(1+z^2)$.

4 Claims, 1 Drawing Sheet

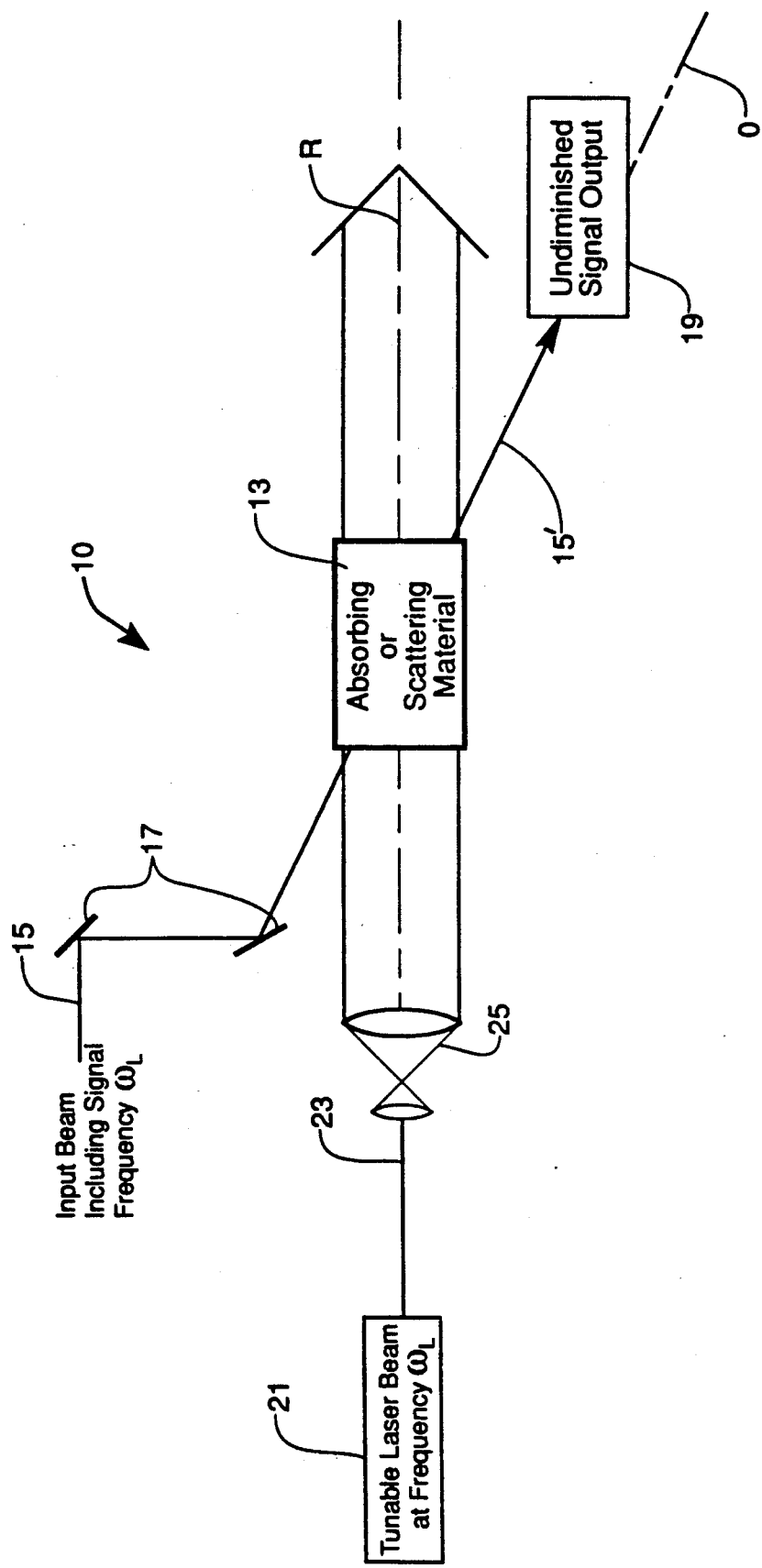

METHOD AND APPARATUS FOR FIELD-INDUCED TRANSPARENCY USING LASER RADIATION

RIGHTS OF THE GOVERNMENT

The invention described herein may be manufactured and used by or for the Government of the United States for all governmental purposes without the payment of any royalty.

BACKGROUND OF THE INVENTION

The present invention relates generally optical switching devices for selectively reflecting or transmitting laser radiation, and more particularly to system and method for tuning a material to selectively induce transparency therein at a preselected laser frequency.

In accordance with the invention, a material having a ground state and closely spaced first and second excited states is selected wherein the transition dipole moment between the ground state and first excited state is parallel to the dipole moment connecting the ground state and second excited state. The material is irradiated with laser radiation of frequency related directly to the transition frequencies of the material from the ground to the first and second excited states. After a short time the material becomes transparent to the irradiated frequency.

It is therefore a principal object of the invention to provide system and method for selectively inducing transparency to laser radiation in a material.

It is a further object of the invention to provide an optical switching device comprising a material in which transparency to laser radiation is selectively induced.

These and other objects of the invention will become apparent as a detailed description of representative embodiments proceeds.

SUMMARY OF THE INVENTION

In accordance with the foregoing principles and objects of the invention, system and method for selectively inducing transparency to laser radiation in a material are described comprising a material having a ground state and two closely-spaced first and second excited states wherein the transition dipole moment $d_1$ between the ground and first excited states is parallel to the dipole moment $d_2$ between the ground and second excited states, and wherein $d_1$ is substantially equal to $zd_2$ where $z$ is a scalar constant characteristic of the material, and wherein the frequencies of transition between the ground and first excited states and between the ground and second excited states are $\omega_o$ and $\omega_o+\Delta$, respectively, and a source of laser radiation for substantially totally irradiating the material with laser radiation of frequency $\omega_L$ substantially equal to $\omega_o+\Delta/(1+z^2)$.

DESCRIPTION OF THE DRAWINGS

The invention will be more clearly understood from the following detailed description of representative embodiments thereof read in conjunction with the accompanying drawing which is a diagram of a system incorporating the invention.

DETAILED DESCRIPTION

Theoretical discussions related to the invention, including solutions to equations descriptive of the underlying principles of the invention, are presented in "Effects of Atomic-state Coherence and Spontaneous Emission on Three-level Dynamics," by D. A. Cardimona, Phys Rev A 41, 5016 (1990), the background material and entire teachings of which are incorporated by reference herein.

In accordance with the principles governing the invention, consider a material comprising atoms or molecules having a ground state $|g>$ and two closely-spaced excited states $|1>$ and $|2>$, and in which the transition dipole moment $d_1$ between $|g>$ and $|1>$ is parallel to the dipole moment $d_2$ between $|g>$ and $|2>$, that is.

$$d_1 = zd_2 \qquad (1)$$

where $z$ is a scalar constant characteristic of the material. For materials of general interest herein, the spacing between the first and second excited states is about $10^{-4}$ to $10^3$ GHz. If the frequencies of the $|g>$ to $|1>$ and $|g>$ to $|2>$ transitions are $\omega_o$ and $\omega_o+\Delta$, respectively, light incident on the material at or near either of these frequencies will usually be absorbed or scattered out of the propagation direction. However, if laser light of frequency $\omega_L$ given by, $$\omega_L \omega_o + \Delta/(1+z^2) \qquad (2)$$

is incident on the material, after a few nanoseconds, depending on the spontaneous lifetime of the excited states, the material becomes transparent to radiation of frequency $\omega_L$, which effect is independent of the power of the transparency-inducing laser radiation $\omega_L$.

Referring now to the drawing, illustrated therein is an optical system 10 incorporating the invention. In accordance with the governing principles of the invention, a quantity of radiation absorbing or scattering material 13 is disposed along an optical axis O of system 10. Material 13 may take any suitable form as would occur to a skilled artisan practicing the invention, such as a filter, lens, mirrored surface or other optical element or coating thereon. A laser beam 15 incident upon system 10 may be directed upon material 13 through suitable optics 17. Beam 15 ordinarily includes a signal beam of frequency $\omega_L$ containing information intended for propagation along axis O as beam 15' of frequency $\omega_L$ to a detector 19, and may contain other frequencies intended to be absorbed or scattered by material 13. Material 13 is selected to have the characteristics described above and in Cardimona, supra, wherein the ground and first and second excited states of material 13 have transition frequencies corresponding to $\omega_L$ substantially according to expression (2) above. Accordingly, material 13 may comprise substantially any material with the desirable energy level scheme as is readily determinable from the literature by one skilled in the applicable art guided by these teachings. A laser source 21 is disposed to project tunable laser beam 23 along optical axis R through material 13. For most materials 13 of interest in the invention, beam 23 may be tunable in the range of about $3 \times 10^{13}$ to $3 \times 10^{16}$ sec$^{-1}$. Beam expander optics 25 expand tunable beam 23 sufficiently to illuminate substantially all of material 13.

In the operation of system 10 according to the invention, material 13 may initially be substantially non-transmissive of beam 15 at substantially all frequencies including $\omega_L$. Laser source 21 is tuned to $\omega_L$ and tunable beam 23 is projected through material 13 to induce transparency therein to the desired signal frequency $\omega_L$ in beam 15.

The invention therefore provides system and method for tuning a material to selectively induce transparency therein at a preselected laser frequency. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. A system for tuning a material to selectively induce transparency therein at a preselected laser frequency, comprising:
   (a) a material having a ground state and two closely-spaced first and second excited states wherein the transition dipole moment $d_1$ between said ground state and said first excited state is parallel to the dipole moment $d_2$ between said ground state and said second excited state, and wherein $d_1$ is substantially equal to $zd_2$ where z is a scalar proportionality constant characteristic of said material, and wherein the frequencies of transition between said ground state and said first excited state and between said ground state and said second excited state are, respectively, $\omega_o$ and $\omega_o+\Delta$; and
   (b) a source of laser radiation for substantially totally irradiating said material with laser radiation of frequency $\omega_L$ substantially equal to $\omega_o+\Delta/(1+z^2)$.

2. The system of claim 1 wherein said laser radiation has a frequency in the range of about $3\times10^{13}$ to $3\times10^{16}$ sec$^{-1}$.

3. A method for tuning a material to selectively induce transparency therein at a preselected laser frequency, comprising the steps of:
   (a) providing a material having a ground state and two closely-spaced first and second excited states wherein the transition dipole moment $d_1$ between said ground state and said first excited state is parallel to the dipole moment $d_2$ between said ground state and said second excited state, and wherein $d_1$ is substantially equal to $zd_2$ where z is a scalar proportionality constant characteristic of said material, and wherein the frequencies of transition between said ground state and said first excited state and between said ground state and said second excited state are, respectively, $\omega_o$ and $\omega_o+\Delta$;
   (b) providing a source of laser radiation of frequency $\omega_L$ substantially equal to $\omega_o+\Delta/(1+z^2)$; and
   (c) substantially totally irradiating said material with laser radiation of frequency $\omega_L$.

4. The method of claim 3 wherein said laser radiation has a frequency in the range of about $3\times10^{13}$ to $3\times10^{16}$ sec$^{-1}$.

* * * * *